United States Patent
Nixon et al.

(10) Patent No.: US 9,413,871 B2
(45) Date of Patent: Aug. 9, 2016

(54) TEXTING WHILE DRIVING CAUTION SYSTEM FOR A VEHICLE

(71) Applicant: Toyota Motor Engineering & Manufacturing North America, Inc., Erlanger, KY (US)

(72) Inventors: Bradley B. Nixon, Macomb, MI (US); Matthew Montgomery, Redford, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/564,137

(22) Filed: Dec. 9, 2014

(65) Prior Publication Data

US 2016/0165034 A1    Jun. 9, 2016

(51) Int. Cl.
*H04M 1/725* (2006.01)
*H04M 1/60* (2006.01)
*H04W 4/14* (2009.01)

(52) U.S. Cl.
CPC ........ *H04M 1/72527* (2013.01); *H04M 1/6083* (2013.01); *H04W 4/14* (2013.01)

(58) Field of Classification Search
CPC ..... H04W 4/008; H04W 4/046; H04W 4/021; H04W 4/027; H04W 8/22; H04W 12/06; H04W 48/04; H04W 88/02; H04W 36/32; H04W 36/34; H04W 48/02; H04W 4/12; G08G 1/163; H04M 1/72577; H04M 2250/02; H04L 51/12; H04L 12/5895; H04L 67/12
See application file for complete search history.

(56) References Cited

U.S. PATENT DOCUMENTS

| | | | |
|---|---|---|---|
| 8,417,268 B1* | 4/2013 | Halferty | H04W 4/027 455/410 |
| 8,706,143 B1 | 4/2014 | Elias | |
| 9,042,872 B1* | 5/2015 | Breed | H04M 1/72577 455/414.1 |
| 9,060,072 B2* | 6/2015 | Hynes | H04M 1/72577 |
| 2009/0002147 A1* | 1/2009 | Bloebaum | H04M 1/6075 340/466 |
| 2009/0253423 A1 | 10/2009 | Kullberg | |
| 2011/0159842 A1* | 6/2011 | Vander Veen | G01S 19/14 455/410 |
| 2011/0219080 A1* | 9/2011 | McWithey | H04M 1/72552 709/206 |
| 2012/0215540 A1* | 8/2012 | Goktekin | H04L 12/5835 704/260 |
| 2012/0238286 A1* | 9/2012 | Mallavarapu | H04M 1/72577 455/456.1 |
| 2012/0268235 A1* | 10/2012 | Farhan | G05B 23/0278 340/3.1 |
| 2014/0313056 A1* | 10/2014 | Pallotta | H04W 4/008 340/901 |

FOREIGN PATENT DOCUMENTS

GB    2507684 A    7/2014

* cited by examiner

*Primary Examiner* — Nizar Sivji
(74) *Attorney, Agent, or Firm* — Christopher G. Darrow; Darrow Mustafa PC

(57) ABSTRACT

A texting while driving caution system for a vehicle includes a vehicle control system operable to communicate with a personal electronic device via a wireless communication protocol. The control system is operable to display a caution in response to a text message being generated on the personal electronic device while the vehicle is in motion.

14 Claims, 2 Drawing Sheets

TEXTING WHILE DRIVING CAUTION SYSTEM FOR A VEHICLE

BACKGROUND

The present disclosure relates to a vehicle and, more particularly, to a texting while driving caution system therefor.

Texting, emailing, or using the internet (hereinafter collectively "texting") while driving may result in questionable driving practices. Some jurisdictions may have laws that make "texting while driving" illegal. Such communications have become so widespread, however, that enforcement thereof is onerous and likely will have no significant effect.

SUMMARY

The system described herein includes a texting while driving caution system for use in connection with a personal electronic device. The texting while driving caution system is operable to display a caution in response to a text message being generated on the personal electronic device while the vehicle is in motion. The caution can include a visual and/or audio display and/or communication with an off board personal electronic device such as that of a parent, guardian, or vehicle owner.

A system for a vehicle operable to communicate with a personal electronic device includes, according to one disclosed non-limiting embodiment, a texting while driving caution system operable to display a caution in response to a text message being generated on the personal electronic device while the vehicle is in motion.

A texting while driving caution system for a vehicle includes, according to another disclosed non-limiting embodiment, a texting while driving caution system operable to communicate with a personal electronic device via a wireless communication protocol, the texting while driving caution system operable to display a caution in response to a text message being generated on the personal electronic device while the vehicle is in motion.

A computer storage media having embodied thereon computer-usable instructions that, when executed, performs a method, the method including, according to another disclosed non-limiting embodiment, displaying a caution in response to a text message being generated on a personal electronic device while the vehicle is in motion.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

This disclosure teaches a system and a method for displaying a caution in response to a text message being generated on a personal electronic device while a vehicle is in motion. The caution can include a visual and/or audio display within the vehicle. The caution may also be communicated to an off-board personal electronic device in response to a multiple of text messages being generated within a predetermined time period. The caution may also be communicated to a remote computer, for example, of an insurance carrier.

Figure 1:
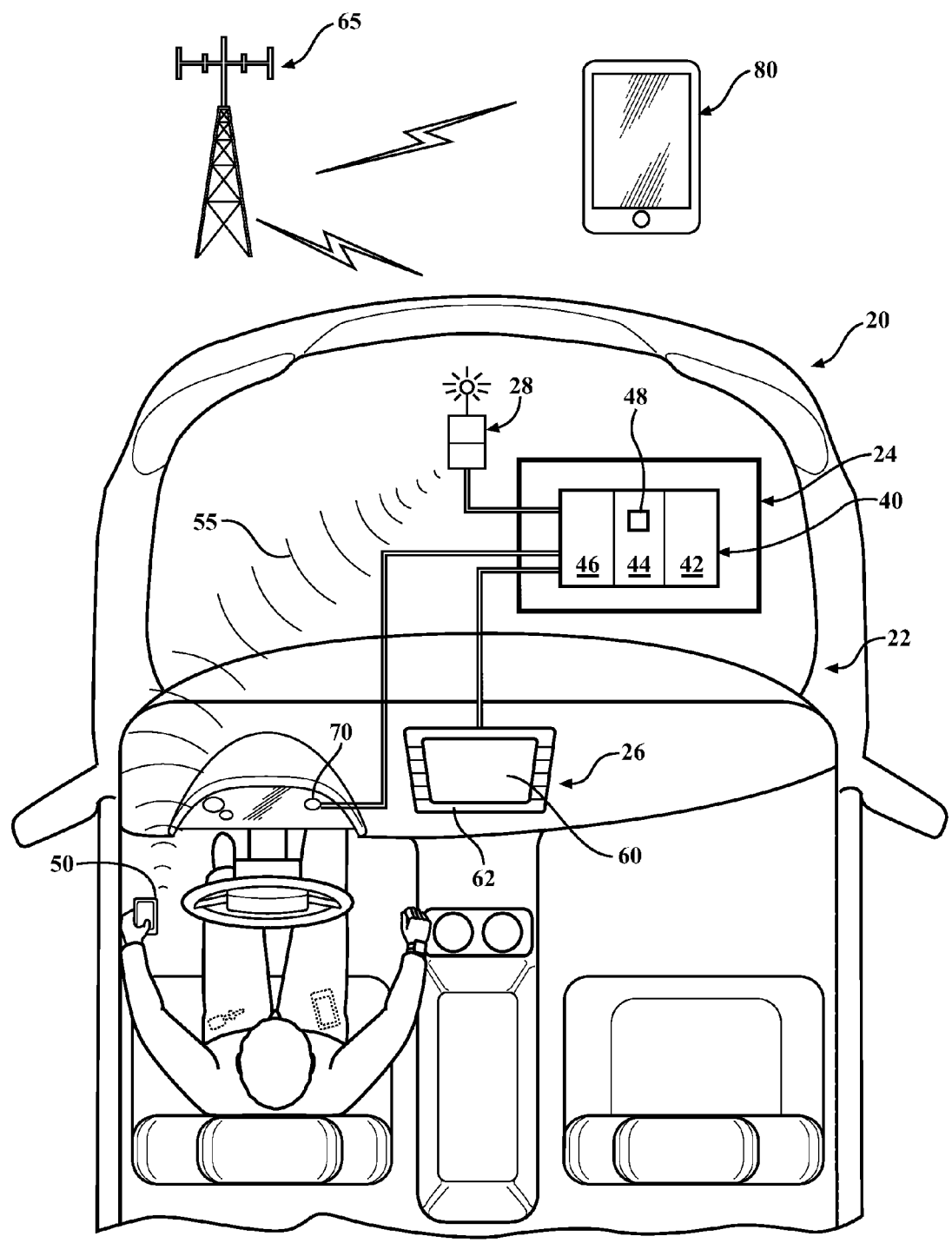
FIG. 1 is a schematic view of an example vehicle system.

FIG. 1 schematically illustrates a vehicle 20 with a texting while driving caution system 22. The texting while driving caution system 22 generally includes a control system 24, an interactive display system 26, and a communication system 28. It should be appreciated that although particular systems are separately defined, each or any of the systems may be otherwise combined, or segregated, via hardware and/or software.

The control system 24 generally includes a control module 40 with a processor 42, a memory 44, and an interface 46. The control module 40 may be a portion of a central vehicle control, a stand-alone unit, or other system such as a cloud-based system. The processor 42 may be any type of microprocessor having desired performance characteristics. The memory 44 may include any type of computer readable medium that stores the data and control algorithms described herein such as a texting while driving caution algorithm 48. Other operational software and algorithms for the processor 42 may also be stored in the memory 44.

The interface 46 facilitates communication 55 with on-board systems such as the interactive display system 26 and the communication system 28. The interface 46 also provides for communication and information exchange with other on-board and off-board vehicle systems via the communication system 28. On-board systems include, but are not limited to, vehicle sensors that provide, for example, vehicle speed, vehicle location, fuel level, and other vehicle related information. Off-board vehicle systems include, but are not limited to, a personal electronic device 50 of the user (e.g. a tablet, smart phone, wearable device, or other mobile device). That is, the personal electronic device 50 may be any device carried or worn by the driver.

The communication system 28 provides wireless communication 55 via various types of wireless data communication protocols, e.g., Bluetooth™, ZigBee, ANT™, WiFi, WiMax, cellular network, and others with, for example, the personal electronic device 50. A cellular network 65 (illustrated schematically) may include mobile devices, cell sites, base stations, repeaters, antennas, towers, and the like and may include GSM, GPRS, 3G, EVDO, mesh, or other cellular network types. It should be appreciated that various cellular, satellite, and other communication systems may alternatively, or additionally, be utilized. The communication system 28 may include direction, or other capability to determine if the driver and/or a passenger establish communication 55 between the personal electronic device 50 and the control system 24.

The interactive display system 26 includes a display 60 with mechanical control elements 62 arranged to provide a human-machine interface within the vehicle cabin. Alternatively, the display 60 combines at least some of the control elements into a touch panel display.

Figure 2:
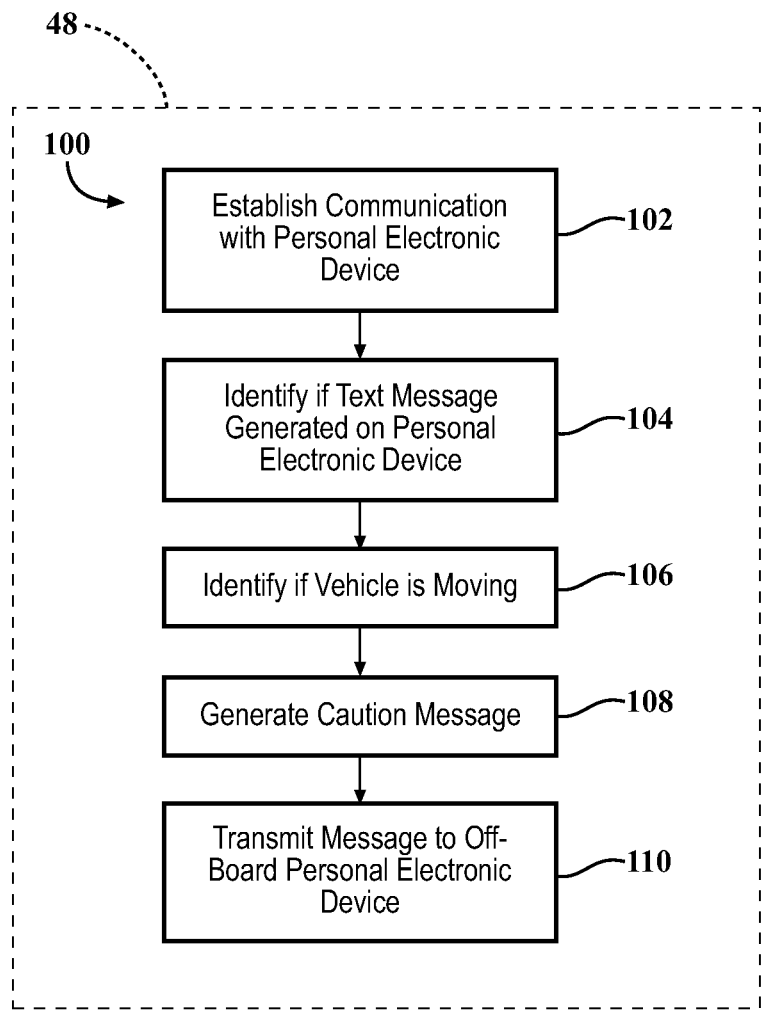
FIG. 2 is a flow chart illustrating operations of the vehicle system according to one disclosed non-limiting embodiment.

With reference to FIG. 2, the functions of the algorithm 48 are disclosed in terms of functional block diagrams, and it should be appreciated that these functions may be enacted in either dedicated hardware circuitry or programmed software routines capable of execution in a microprocessor based electronics control embodiment. That is, the memory 44 is an example computer storage media having embodied thereon computer-useable instructions such as the algorithm 48 that, when executed, performs a method 100 to generate a texting while driving caution for display on the display 60 of the interactive display system 26 in response to texting on the personal electronic device 50 while the vehicle 20 is in motion.

With reference to FIG. 2, a method 100 according to one disclosed non-limiting embodiment initially identifies the establishment of communication 55 between the personal electronic device 50 and the control system 24 (step 102). It should be appreciated that such communication is typically established to permit access to the personal electronic device 50 by a vehicle multimedia head unit, center display unit, or other vehicle system generally represented herein by the control system 24 so that, for example, the texting while driving caution system 22 may access the content of the personal electronic device 50 and provide hands free access thereto. This establishment of communication 55 with the personal electronic device 50, in addition to providing the aforementioned access, also permits operation of the texting while driving caution system 22. Typically, once the personal electronic device 50 established communication 55 such communication is reestablished automatically.

Alternatively, or in addition thereto, an application can be downloaded to the personal electronic device 50, such that texts, emails, or Internet usage are delayed or prevented while driving upon establishment of communication 55. Further, remote enablement functions, such as parents being able to inactivate texting capability while their child is driving, may be incorporated upon establishment of communication 55 with the control system 24.

Next, the control system 24 identifies whether a text message is generated on the personal electronic device 50 (step 104). As communication has been established between the personal electronic device 50 and the control system 24, such text message generation identification is readily achieved when the text message is sent and recognized by the control system 24.

Next, the control system 24 identifies whether the vehicle is moving while the text message is generated on the personal electronic device 50 (step 106). If the text message is generated on the personal electronic device 50 while the vehicle is moving (step 106), the control system 24 generates a caution message (step 108) on the display 60. For example, the caution might be "PLEASE DO NOT TEXT WHILE VEHICLE IS IN MOTION" or some other such caution that replaces that which is displayed on the display 60. Alternatively, or in addition thereto, the caution message may include illumination of a warning or "telltale" light 70 (FIG. 1). The caution might additionally, or alternatively, include audio or other notifications within the vehicle such as pausing the current audio content from the vehicle audio system.

Further, should a subsequent text message be generated on the personal electronic device 50 within a predetermined time period, the control system 24 may communicate the caution to another computer or off-board personal electronic device 80 (step 110) in addition to that displayed on the display 60 (FIG. 1). For example, the off-board personal electronic device 80 may be that of a parent who receives a text message or other alert regarding usage of the personal electronic device 50. The control system 24 thereby alerts a remote authorized user that is off-board the vehicle 20 to on-board vehicle text message generation. The control system 24 may alternatively or additionally provide options for the off-board personal electronic device 80 to monitor and/or lock vehicle systems to facilitate safe driving. It should be appreciated that additional, or alternative, steps may be performed such as locking out the vehicle entertainment system (e.g., AM/FM radio, satellite radio, and CDs). The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A texting while driving caution system for a vehicle, comprising:
 a vehicle-installed display in a cabin of a vehicle; and
 a vehicle-installed control system in communication with the display, the control system operable to:
  establish communication with a personal electronic device, the communication providing access to a content of the personal electronic device,
  identify, based on the personal electronic device's content, the generation of a first outgoing text message on the personal electronic device while the vehicle is in motion, the generation of a second outgoing text message on the personal electronic device while the vehicle is in motion, and a time between the generation of the first outgoing text message on the personal electronic device and the generation of the second outgoing text message on the personal electronic device,
  operate the vehicle display to display a texting while driving caution in response to the first outgoing text message being generated on the personal electronic device,
  if the time between the generation of the first outgoing text message on the personal electronic device and the generation of the second outgoing text message on the personal electronic device is within a predetermined time period, communicate another texting while driving caution to another separate, off-board system in response to the second outgoing text message being generated on the personal electronic device, and if the time between the generation of the first outgoing text message on the personal electronic device and the generation of the second outgoing text message on the personal electronic device is not within the predetermined time period, not communicating the other texting while driving caution to the other separate, off-board system in response to the second outgoing text message being generated on the personal electronic device.

2. The system as recited in claim 1, wherein the first outgoing text message and the second outgoing text message each include at least one of text, email, and Internet browsing.

3. The system as recited in claim 1, wherein the control system is operable to establish communication with the personal electronic device via a wireless communication protocol.

4. The system as recited in claim 1, wherein the other off-board system is associated with an insurance agency.

5. The system as recited in claim 1, wherein the control system is operable to determine whether the vehicle is in motion.

6. The system as recited in claim 1, wherein the displayed texting while driving caution is addressed directly to a user of the personal electronic device.

7. A non-transitory computer storage media having embodied thereon computer-useable instructions that, when executed, perform a method, the method comprising:

establish communication between a vehicle-installed control system and a personal electronic device, the communication providing access to a content of the personal electronic device;

identify, with the control system, based on the personal electronic device's content, the generation of a first outgoing text message on the personal electronic device while the vehicle is in motion, the generation of a second outgoing text message on the personal electronic device while the vehicle is in motion, and a time between the generation of the first outgoing text message on the personal electronic device and the generation of the second outgoing text message on the personal electronic device;

operating, with the control system, a vehicle-installed display in a cabin of the vehicle to display a texting while driving caution in response to the first outgoing text message being generated on the personal electronic;

if the time between the generation of the first outgoing text message on the personal electronic device and the generation of the second outgoing text message on the personal electronic device is within a predetermined time period, communicating, with the control system, another texting while driving caution to another separate, off-board system in response to the second outgoing text message being generated on the personal electronic device; and if the time between the generation of the first outgoing text message on the personal electronic device and the generation of the second outgoing text message on the personal electronic device is not within the predetermined time period, not communicating the other texting while driving caution to the other separate, off-board system in response to the second outgoing text message being generated on the personal electronic device.

8. The method as recited in claim 7, wherein the first outgoing text message and the second outgoing text message each include at least one of text, email, and Internet browsing.

9. The method as recited in claim 7, wherein the communication is established via a wireless communication protocol.

10. The method as recited in claim 7, wherein the other off-board system is associated with an insurance agency.

11. The method as recited in claim 7, further comprising:
determining, with the control system, whether the vehicle is in motion.

12. The method as recited in claim 7, wherein the displayed texting while driving caution is addressed directly to a user of the personal electronic device.

13. The method as recited in claim 7, wherein the displayed texting while driving caution is approximately "PLEASE DO NOT TEXT WHILE VEHICLE IS IN MOTION".

14. The system as recited in claim 1, wherein the displayed texting while driving caution is approximately "PLEASE DO NOT TEXT WHILE VEHICLE IS IN MOTION".

* * * * *